June 4, 1957 H. H. ABBOTT ET AL 2,794,859
STATION IDENTIFICATION SYSTEMS
Filed June 28, 1954
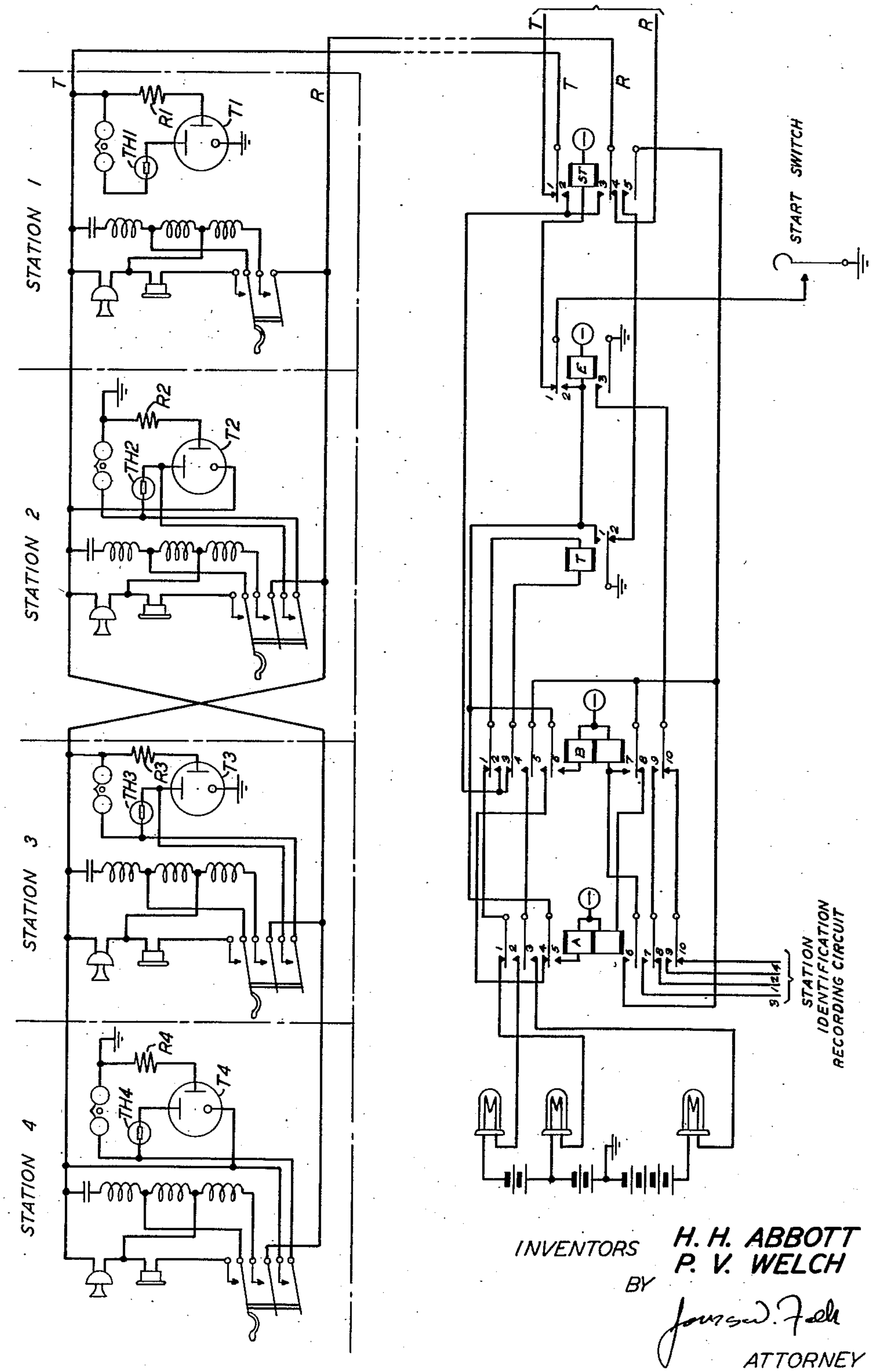
INVENTORS H. H. ABBOTT
P. V. WELCH
BY [signature]
ATTORNEY United States Patent Office 2,794,859
Patented June 4, 1957

2,794,859

STATION IDENTIFICATION SYSTEMS

Henry H. Abbott, Yonkers, and Paul V. Welch, Brooklyn, N. Y., assignors to Bell Telephone Laboratories, Incorporated, New York, N. Y., a corporation of New York Application June 28, 1954, Serial No. 439,666

6 Claims. (Cl. 179—17)

This invention relates to telephone systems and more particularly to identification of calling stations on a party line.

Station identification systems normally used in automatic telephone systems make discriminating tests of a party line for the purposes of ascertaining the station initiating a call on a multiparty line. The usual purpose for station identification systems is the proper identification of a calling station on a party line to enable the message registers or other station identification recording systems to correctly charge the calls made on party lines.

Objects of this invention are to provide a positive and reliable identification of the calling station on a party line, this positive and reliable identification being effected by an economical system, to utilize a minimum of equipment at the stations and to simplify the necessary equipment at the station and at the central office.

A feature of the invention pertains to the identification of the calling station by the selected use of thermistors.

Another feature of the invention relates to the use of cold cathode gas tubes in conjunction with thermistors at some of the stations to control the flow of current at the station.

Another feature of the invention resides in the means to apply varied potentials to the conductors of the line in rapid sequence.

This invention provides a switching arrangement at the central office whereby positive and negative potentials of varied magnitudes are applied to both conductors of the line in rapid sequence. The identification of the calling station is completed at the central office by the detection of the presence or absence of current flow to ground at a calling station during the interval that each of the aforementioned potentials is applied to the conductors of the line. The flow of current during the application of the test voltages is controlled by the use of thermistors at the stations. The detection device is a switching arrangement permitting accurate identification of the calling station.

In one illustrative embodiment of this invention, each of the plurality of subscribers' stations comprises a normal cold cathode full selective ringing telephone set and a thermistor is provided at each of the stations. The identification of the calling station depends upon the application of positive and negative potentials to the conductors of the line in rapid sequence and the detection during the sequential application of a current flow in the conductors of the line. The station circuits are so designed with thermistor and/or cold cathode gas tubes that direct-current paths to ground from the conductors of the line at the various stations exist immediately after the application of the test voltages only with potentials of a specified polarity and magnitude, and then only if the handset at the station is removed from its mounting thereby closing the switchhook contacts.

One multistation telephone line illustrative of this invention comprises four subscribers' stations. With the handset off the hook and the switchhook contacts closed at any one of three of the four stations, the thermistor at the station with the handset off the hook is short-circuited, thereby providing a path of low resistance to ground at the station. The system for identifying the calling station is located at the central office and depends upon the detection of the flow or absence of flow of current at the calling station during a rapid sequential application of varied potentials to both conductors of the line. The sequence of the applied voltage is minus 48 volts, minus 130 volts and plus 130 volts. The individual stations are identified by circuits for the detection of current flow to ground with the application of one of the aforementioned voltages. The results of the detection means are utilized to operate identification means which identify the calling station.

The invention is illustrated in the accompanying drawing, which consists of a single figure and depicts a party line comprising four stations terminating at the central office in an identification network. The identification network shown includes means for identification tests and for identifying the calling station. The stations include the necessary current controlling devices to make the identification network operable.

The subscribers' stations described hereinafter have typical telephone instruments, each station comprising a ringing device, receiver, transmitter, switchhook device, and a condenser to isolate the voice currents from ground. In addition, the stations include auxiliary circuit elements comprising thermistors TH and cold cathode gas tubes T.

Each tube comprises a cathode, a main anode, and an auxiliary or starter anode. At stations 1 and 3 the cathodes of tubes T1 and T3, respectively, are connected directly to ground and the main anodes of these tubes are connected to the ring and tip conductors, respectively. At stations 2 and 4 the cathodes of tubes T2 and T4, respectively, are connected directly to the tip and ring conductors, respectively, and the main anodes of tubes T2 and T4 are connected to ground. There is also a thermistor TH connected to each of the main anodes of the tubes at all the stations. At stations 2 and 3 these thermistors, TH2 and TH3, are rendered inoperable upon the removal of the handset with the consequent closure of the switchhook contacts at these stations. The removal of the handset and the closure of the switchhook contacts at stations 1 and 4 does not render inoperable the thermistors TH1 and TH4 at stations 1 and 4. The resistors R1—R4 connected to the starter anodes must, where required, permit the necessary amount of starting current to cause the breakdown and conduction of the tube to which they are connected. These resistors may, however, have the usual values necessary for the ringing circuit associated with and necessary to the complete operation of the station. Current does not flow at station 1 during the sequential application of test voltages due to the fact that the correct polarity of voltage to cause the tube T2 to conduct is not applied to the tip conductor and the thermistor TH1 in the main anode circuit acts to insure this lack of current flow.

For convenience the start switch is depicted as being manually operable but it is capable of being related to register circuits or station identification recording circuits and of being closed automatically by signals from such circuits denoting the necessity of identifying the calling station. The closing of the start switch connects ground through the No. 1 contact of relay E to the winding of relay ST thereby operating relay ST. The operation of relay ST immediately impresses upon the tip and ring conductors, through the No. 2 and No. 3 contacts of relay ST, a negative potential of 48 volts. This potential is impressed upon the tip and ring conductors through a circuit comprising the negative 48-volts supply, the No. 1 contact of relay A, the No. 1 contact of relay B, the winding of relay T, the No. 3 contact of relay B and the No. 2 and No. 3 contacts of relay ST which are connected to the party line.

If at this time station 4, for example, has its handset off the hook a path to ground exists at station 4 from the ring side of the line through the lower switchhook contact and thence through the ringing device to ground. Upon application of the aforementioned potential the resulting current flow through these circuits will cause relay T to operate thereby connecting ground through the No. 1 contact of relay T to the winding of relay E. Relay E now operates and removes ground from the winding of relay ST thereby releasing relay ST to disconnect the identification potential at the central office from the party line. The operation of relay E imposes ground through the No. 3 contact of relay E, the No. 10 contact of relay B, the No. 10 contact of relay A upon the lead No. 4 of the station identification recording circuit. This ground potential will be utilized by other equipment comprising the station identification circuit to identify the calling station, in this instance station No. 4. In operating, relay E locks itself operated from the ground applied at the start switch through the No. 2 contact of relay E to the windings of relay E. This locking ground will be applied until such time as the station identification recording circuit, which may be of any appropriate type, indicates that the identification has been completed with the registering of the identification of the calling station.

The station identification recording circuit is interconnected with the start switch and upon completion of the identification and the registering of the identity of the calling station, ground which under the automatic operation was impressed under the control of the station identification recording circuit or message register circuit is removed from the start switch. At this time relay E is released by the removal of ground from the start switch which removes ground from the locking circuit described above and the part of the circuit at the central office is restored to its normal position.

If station 4 did not have its handset off the hook and its switchhook contacts closed there would have been no current flow upon the application of the minus 48 volts to the line and relay T would not have operated and the identification process would not have ceased. Rather, a connection would be established from ground through the No. 2 contact of relay T, the No. 5 contact of relay ST, the No. 8 contact of relay B to battery, through the windings of relay A. Relay A now operates with an operate time so designed that the application of the aforementioned voltage has been of sufficient duration to allow relay T to operate if station 4 were the calling station. The operation of relay A impresses upon the tip and ring conductors a negative potential of 130 volts through a circuit including a negative 130-volt source, the No. 2 contact of relay A, the No. 1 contact of relay B, the winding of relay T, the No. 3 contact of relay B and the No. 2 and No. 3 contacts of relay ST which are connected to the tip and ring conductors.

With the negative potential of 130 volts applied at the tip and ring conductors and when station 2 has its receiver off the hook and its switchhook contacts closed, a path for current flow to ground exists at station 2. This path results from the application of the negative potential to the cathode of the gas filled tube T2 thus increasing the negative potential of the cathode of the gas tube thereby causing the tube to break down and conduct. The flow of current to ground at station 2 is thus from the cathode of the gas filled tube to the anode of the tube, then through the lower set of switchhook contacts to the ringing device and ground. This current also flows through the identification circuit at the central office and operates relay T thereby ending the identification process and restoring the part of the circuit at the central office to normal as described hereinbefore. The operation of relay T at this time also performs another function. It connects holding ground through its No. 1 contact and the No. 5 contact of relay A to hold relay A operated until relay E operates as described hereinbefore. Upon operation of relay E the holding ground which was applied to the winding of relay E is also applied to the winding of relay A thus maintaining relay A operated until the identification process is completed and the part of the circuit at the central office is restored to normal as described hereinbefore. However, ground is now applied to lead 2 of the station identification recording circuit to identify station 2 through a circuit from ground through No. 3 contact of relay E, the No. 10 contact of relay B and the No. 9 contact of relay A.

If station 2 did not have its switchhook contacts closed relay B would subsequently be operated by a circuit comprising ground, the No. 2 contact of relay T, the No. 5 contact of relay ST, the No. 6 contact of relay A, the lower winding of relay B and battery.

The operation of relay B impresses a positive potential of 130 volts upon the tip and ring conductors of the line through a circuit comprising the positive 130-volts source, the No. 3 contact of relay A, the No. 4 contact of relay B, the winding of relay T, the No. 2 contact of relay B and the No. 2 and No. 3 contacts of relay ST. With this positive potential applied to the tip and ring conductors, station No. 3, if its handset is off the hook and its switchhook contacts are closed, will present a path to ground from the positive voltage applied on the ring side of the line. This positive voltage applied to the control anode of gas tube T3 through resistance R3 will be sufficient to cause the breakdown and conduction of the gas tube at station No. 3. A circuit for the flow of current is thus established from the positive potential on the ring side, through the ringing device, through the lower switchhook device, to the main anode of the tube, through the tube to the cathode and thence to ground. This current will also flow in the identification circuit at the central station as described before and will be of sufficient magnitude to operate relay T which operates relay E as described herein. The holding ground described hereinbefore as being applied to relay A is now applied jointly to relays A and B and the removal operation of the identification process remains as described. However, at this time ground applied through the No. 3 contact of relay E will identify station 3 in a circuit comprising No. 3 contact of relay E, the No. 9 contact of relay B, the No. 7 contact of relay A, and the station identification recording circuit.

If during this sequence of voltage applications, none of the three stations mentioned before had their handsets off the hook and their switchhook contacts closed, no current flow would have been occasioned by the rapid application of the aforementioned voltages. This is due to the thermistors utilized at the stations. The thermistors are resistances with a negative temperature coefficient of resistance, and are so designed that the application of the voltages is completed before any of the thermistors have been heated to a temperature which lowers the resistance of the thermistor to a point at which it would permit current flow upon the application of potentials of the magnitude described herein.

Upon the completion of the application of the three voltages relay A releases and in releasing operates relay E thereby removing that part of the circuit at the central office from the party line as described hereinbefore. The release time of relay B is such that relay B will not release until after the operattion of relay E now to be described. Relay E is operated from the ground through the No. 2 contact of relay T, the No. 5 contact of relay ST, the No. 5 contact of relay B, the No. 4 contact of relay A, the winding of relay E and thence to battery.

This operation of relay E places ground to the station identification recording circuit or message register so as to identify station 1 through a circuit comprising the No. 3 contact of relay E, the No. 9 contact of relay B, the No. 8 contact of relay A and the register. Operation of relay E at this time also disconnects ground from the winding of relay ST and removes that part of the identification system at the central station from the line conductors as previously described.

What is claimed is:

1. In a telephone system having a plurality of subscribers' lines including a line having a plurality of stations connected thereto, means including trigger devices and resistances having a negative temperature coefficient of resistance at each of said stations to control the flow of current between the conductors of the line and ground at said stations, sources of potential having opposite polarities in varied magnitudes, means for applying one or more of said potentials in sequence to the conductors of said line, means for detecting the flow of current between the conductors of the line and ground at said stations, means controlled by said detection means for identifying the stations on said line.

2. In a telephone system, a line having a plurality of stations connected thereto, means at each of said stations including electronic trigger devices and resistances having a negative temperature coefficient of resistance to control the flow of direct current to ground at said stations, sources of potential of opposite polarities and varied magnitudes, means for applying one or more of said potentials in sequence to the conductors of said line in a network including detection means, said detection means comprising the winding of a relay for detecting the flow of current between said conductors and ground at said stations, and means controlled by said detection means for identifying a calling one of said stations.

3. In a telephone system having a plurality of subscribers' lines including a line having a plurality of stations connected thereto, current control means at each of said stations including electronic trigger devices and resistances having a negative temperature coefficient of resistance, additional means at certain of said stations comprising the switchhook contacts to alter said current control means by rendering inoperable said resistances upon the closure of said switchhook contacts, sources of potential of opposite polarities and varied magnitudes, means for applying said potentials in sequence to the conductors of said line, means for detecting the flow of current between the sources of potential and ground at said stations, and means controlled by said detecting means for identifying a calling one of said stations.

4. In a telephone system, a line having a plurality of stations connected thereto, means at each of said stations to control the flow of direct current to ground at said stations including gas tubes, resistances having a negative temperature coefficient of resistance and switchhook contacts, sources of potential of opposite polarities and magnitudes, means comprising relays for successively applying said potentials to the conductors of said line, means comprising relays responsive to the flow of current in a circuit including the sources of potential, the winding of one of said relays, the conductors of the line, the switchhook contacts at said stations and the current controlling devices at said stations for identifying a calling station on said line, and means controlled by said last-mentioned means for interrupting the application of said potentials.

5. In a telephone system having a plurality of subscribers' lines including a line having a plurality of four stations connected thereto, current control means at each of said stations including gas tubes and resistances having a negative temperature coefficient of resistance, additional current control means at three of said stations comprising the switchhook contacts at said stations, sources of potential including two negative potentials of varied magnitude and a positive potential equal in magnitude to one of the negative potentials, means for applying in sequence the two negative potentials and then the positive potential to the conductors of the line, means comprising the winding of a relay for detecting the flow of current in a circuit including said sources of potential, said winding and said current control means, means comprising relays controlled by the flow or absence of flow of current through the winding of the relay comprising said detection means for identifying a calling one of said stations on said line, and means controlled by the flow of current in said detecting means for interrupting the sequential application of said potentials.

6. In a telephone system having a plurality of subscribers' lines including a line having four stations connected thereto, current control means at each of said stations including cold cathode gas tubes and resistances having a negative temperature coefficient of resistance to control the flow of direct current to ground thereat, additional means at three of said stations comprising switchhook contacts so arranged in a network with said current control means that the closure of the switchhook contacts at these three stations upon the removal of the receiver for the purposes of making a call renders inoperable said resistances thereat, sources of potential including two negative potentials of varied magnitude and a positive potential equal in magnitude to one of the negative potentials, means comprising a network of relays including the winding of one relay for successively applying the two negative potentials and the positive potential to the conductors of the line, detection means comprising said relay winding for detecting the flow of current at said three of said stations in a circuit including the sources of potential, said winding, the conductors of the line, the switchhook contacts of said three stations and the operable current controlling devices at said stations, means comprising relays controlled by the flow or absence of flow of current through said winding for identifying a calling one of said stations on said line, and means controlled by the flow of current in said detection means for interrupting the sequential application of said potentials.

References Cited in the file of this patent

UNITED STATES PATENTS

| | | |
|---|---|---|
| 2,277,623 | Allen | Mar. 24, 1942 |
| 2,615,094 | Mitchell | Oct. 21, 1952 |